United States Patent [19]
Day et al.

[11] Patent Number: 5,996,025
[45] Date of Patent: Nov. 30, 1999

[54] NETWORK TRANSPARENT ACCESS FRAMEWORK FOR MULTIMEDIA SERVING

[75] Inventors: Michael Norman Day, Round Rock; Peggy PakFan Dixon; Thanh-ha Pham, both of Austin, all of Tex.; Lance Warren Russell, Hollister, Calif.; Danling Shi, Austin, Tex.; Richard Lee Verburg, Austin, Tex.; Donald Edwin Wood, Austin, Tex.; Leo Yue Tak Yeung, Austin, Tex.

[73] Assignee: International Business Machines Corp., Armonk, N.Y.

[21] Appl. No.: 08/961,704

[22] Filed: Oct. 31, 1997

[51] Int. Cl.$^6$ ............................ G06F 13/00
[52] U.S. Cl. ................................ 709/302
[58] Field of Search ............... 364/DIG. 1 MS File, 364/DIG. 2 MS File; 709/100, 105, 302, 303, 200, 300, 228

[56] References Cited

U.S. PATENT DOCUMENTS

| | | | |
|---|---|---|---|
| 5,307,456 | 4/1994 | MacKay | 395/154 |
| 5,325,525 | 6/1994 | Shan et al. | 395/650 |
| 5,341,477 | 8/1994 | Pitkin et al. | 395/200 |
| 5,408,465 | 4/1995 | Gusella et al. | 370/17 |
| 5,428,782 | 6/1995 | White | 395/650 |
| 5,504,670 | 4/1996 | Barth et al. | 364/134 |
| 5,508,942 | 4/1996 | Agarwal | 364/514 R |
| 5,544,327 | 8/1996 | Dan et al. | 395/250 |
| 5,548,724 | 8/1996 | Akizawa et al. | 395/200.03 |
| 5,550,982 | 8/1996 | Long et al. | 395/200.13 |
| 5,555,244 | 9/1996 | Gupta et al. | 370/60.1 |
| 5,606,693 | 2/1997 | Nilsen et al. | 395/610 |
| 5,630,007 | 5/1997 | Kobayashi et al. | 386/113 |

*Primary Examiner*—Robert B. Harrell
*Attorney, Agent, or Firm*—Leslie Van Leeuwen; Andrea Pair Bryant; Hughes & Luce, L.L.P.

[57] ABSTRACT

A system, method and computer program are provided for a control server in a client/server environment wherein an API framework facilitates scalable, network transparent, integrated multimedia content loading and data streaming. Concurrent real time content loading and data streaming are possible and techniques are included for admitting new streams only when they can be serviced without negatively affecting current system performance.

15 Claims, 4 Drawing Sheets

NETWORK TRANSPARENT ACCESS FRAMEWORK FOR MULTIMEDIA SERVING

CROSS-REFERENCE TO RELATED APPLICATIONS

Commonly assigned, copending, concurrently filed applications "METHOD FOR REAL TIME DETERMINISTIC DELIVERY OF MULTIMEDIA DATA IN A CLIENT/SERVER SYSTEM", Michael Day Ser. No. et al., U.S. patent application Ser. No. 08/961,468, filed Oct. 31, 1997, and "SEAMLESS PLAYLIST", Donald E. Wood et al., U.S. patent application Ser. No. 08/961,706, filed Oct. 31, 1997, describe features and functions which may be incorporated into a system in which the present invention is included, and are herewith incorporated by reference.

TECHNICAL FIELD

This invention relates to multimedia client/server computing. More particularly, it relates to a network transparent access framework for improving multimedia serving by providing for integrated multimedia content loading and output data streaming. Still more particularly, it relates to a framework which provides for concurrent, real time video data content loading and data streaming.

BACKGROUND OF THE INVENTION AND PRIOR ART

Client/Server computing has become a common technology enabling resource sharing by network connected users. As prices have decreased and performance criteria have improved, client/server technology has more and more been applied to the sharing of digital multimedia data. Encoding digital multimedia data, especially video data, requires large amounts of storage. A real time constant rate of data delivery is also required lest there be jitter and break up in what should be smooth motion video. These storage and data delivery requirements present unique problems in multimedia client/server computing environments.

Available systems usually provide content loading, input, and data streaming, output, as separate and nonoverlapping operations steps. Therefore, these operations tend to be time consuming, inefficient and not very satisfactory to users.

Typically, servers serve client applications via programming interfaces which vary among themselves. These server access differences require interface specific applications to be written. Thus, it is very difficult to take advantage of the capabilities available in the server for concurrency and real time shared access to multimedia data actually stored in real time.

It would, therefore, be desirable to be able to write integrated applications for concurrently accessing in real time multimedia data available to one or more servers interconnected over one or more networks. There is a need for multimedia server programming services having the flexibility to permit simultaneous multimedia data inputs and outputs while sharing resources available at the server and over the network. Such integrated applications would allow for optimization of server resource utilization with no diminution of service quality. Integrated, network-type transparent applications would enable the request of a combination of services for multimedia data loading and streaming. Further, it is desirable that server management of server and network resource sharing be transparent to provide to the ability to scale up to support additional clients.

In current use are systems for delivering video files from a network for view. Often, it is necessary to prepare for viewing by downloading the video file, which means adequate storage space must be available. It would be desirable to have real time video play; that is, to provide video stream without the necessity of first downloading and possibly storing the entire file before play can begin.

There have been prior art solutions proposed for some aspects of the problems noted above. For example, U.S. Pat. No. 5,555,244 to Gupta et al, issued Sep. 10, 1996, describes a scalable multimedia network and the underlying message structure for APIs useful in the telephony and cable television industries for providing interactive multimedia services to end users. U.S. Pat. No. 5,307,456 to MacKay, issued Apr. 26, 1994 relates to an integrated multimedia production and authoring system and includes a real time network for interconnecting a variety of multimedia resources and a number of production control workstations. The system is scalable to allow any computer system to be used by an individual producer as an edit workstation for accessing any of the network available resources through an intuitive graphical user interface (GUI) to create, edit and store multimedia productions. U.S. Pat. No. 5,508,942 to Agarwal, issued Apr. 16, 1996 relates to intra/inter decision rules for encoding and decoding video signals for used in point-to-point live audio, video, data conferencing between two PC systems. U.S. Pat. No. 5,550,982 to Long et al, issued Aug. 27, 1996 discloses a video application server including software for managing multiple simultaneous video streams transmitted across a local area network (LAN) in a client/server environment.

In a multimedia client/server environment with real time delivery requirements, there is a critical need for resource management. Optimum utilization of system resources, including disk, CPU, bus, and network adapter bandwidth, while avoiding system degradation is essential. Prior art efforts to reach such a level of resource management have not been entirely successful. For example, U.S. Pat. No. 5,408,465 to Gusella et al., issued Apr. 18, 1995, relates to an admission control scheme which does not address control of resources within a given machine in a network. U.S. Pat. No. 5,325,525 to Shan et al., issued Jun. 28, 1994, relates to a resource allocation technique in a best efforts environment, which is not immediately applicable in real time situations. Similarly U.S. Pat. No. 5,548,724 to Akazawa et al., issued Aug. 20, 1996, describes load balancing across file servers in a best efforts environment, not readily adaptable to the constraints of real time situations. U.S. Pat. No. 5,630,007 to Kobayashi et al., issued May 13, 1997, addresses server load distribution in a manner that is independent of considerations of current loads on server or disks. U.S. Pat. No. 5,544,327 to Dan et al., issued Aug. 6, 1996, deals with disk load in a multi client set up, but does not address the effects of current load levels of the server CPU, bus or network adapters.

SUMMARY OF THE INVENTION

The present invention addresses the shortcomings of the prior art by providing a scalable, network transparent application programming interface (API) framework for use in a client/server environment to enable real time, integrated multimedia content loading and data streaming, including concurrent load/record and play from the same multimedia data. In addition, the present invention provides server bandwidth resource management and a load balancing scheme for handling requests from network connected client applications in a manner that optimizes server resource use without degradation to services already in progress. Applications already running are not compromised as new requests arrive since they are subject to admission control scrutiny to prevent overextension of available system resources.

The present invention is embodied in a multimedia video server system implemented in an IBM RS/6000 computer system equipped with the IBM Advanced Interactive Executive (AIX) operating system version 4.2 and the IBM C Set++ licensed program product. The illustrative configuration includes a typical client/server setup with interconnection to one or more networks.

The present invention includes a set of API calling sequences which govern session management, stream connection management, stream operations and asset management. The multimedia services provided are flexible enough to permit simultaneous data inputs and outputs and real time sharing of server and network resources. A common programming model is used for content loading and data streaming, allowing concurrent mixed access to server resources. A common format is used for handles in communications sessions as well as for hardware in the system. Common network address and parameter structures permit transparent access to a plurality of resource and network types.

Such a logical naming convention for all client accessible resources enables changes in the number and actual physical configurations or resources to be made with no requirement for change at the API level. With the present invention, such resource changes have no negative impact on client application function. The control server may then scale up to support a large number of client users. Further, because dynamic configuration update capabilities are provided, changes in server resources occur with no disruption to client services.

BRIEF DESCRIPTION OF THE DRAWINGS

The above mentioned functions, features and advantages will be described in greater detail having reference to the following figures wherein like numerals and symbols are used throughout to refer to the same elements.

DETAILED DESCRIPTION OF THE PREFERRED EMBODIMENT

Before proceeding further, a discussion of the of terms and concepts used throughout this description will be set forth.

Assets are digital multimedia content resources, such as digitized audio or video files, stored for subsequent retrieval by an application. Assets include information about the file such as title and play rate. The present invention contemplates organizing assets into asset groups for facilitating resource allocation. Once an asset is defined over the control interface, which is based on standard LAN technology with Transmission Control Protocol (TCP)/Internet Protocol (IP) and File Transfer Protocol (FTP), the asset may be loaded with either a file or stream protocol. In the present invention, the file protocol is standard FTP and the stream protocol is native ATM AAL5, an industry standard.

Content data is stored on disk. Disk storage is managed using striping, a technique which involves spreading a multimedia file across all of the disks in a file system and writing it to separate disk drives. Stripe groups (SG) are collections of disks grouped together for serving media streams.

Ports are I/O devices for streaming video. Ports are used to set up connections with external equipment or networks to handle playing, recording or piping of video streams. Just as assets are organized into asset groups, ports are organized into port groups. There is one port group per port type.

A stream is a constant flow of multimedia data. In a play stream data flow is outbound only. In a record stream data flow is inbound only. In a pipe stream data is piped from an input port to an output port, bypassing storage. Only play and record streams are associated with assets such as audio, video, text and graphics files. Analog decoders support only outbound, play streams. Asynchronous transport mode (ATM) virtual circuits may be used for inbound or outbound streams.

As used herein, bandwidth (BW) means bit rate per second and a particular bandwidth is associated with each server resource visible to a client application. Such resources include ports, disk assets, stream rate and I/O rate.

Figure 1:
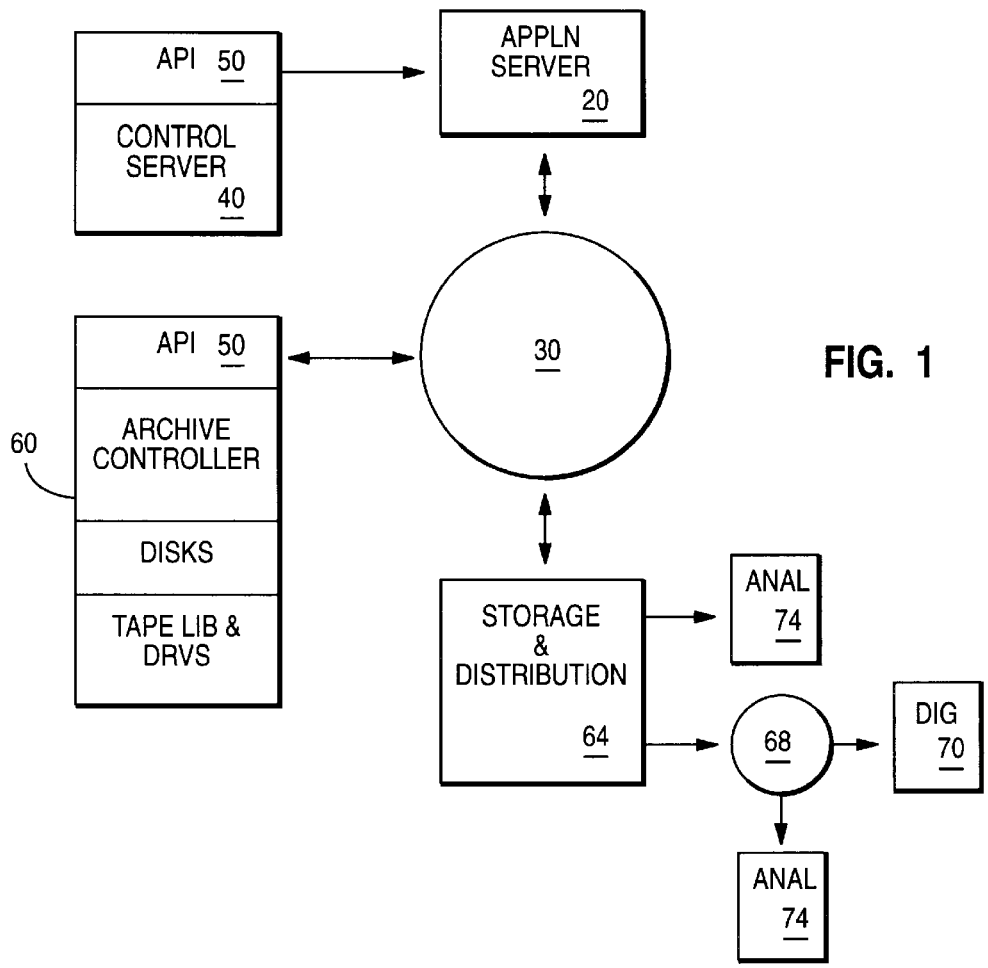
FIG. 1 is a block diagram of a system configuration in which the present invention may be practiced.

Refer now to FIG. 1, an illustrative system environment in which the instant invention is used. Client application server workstation 20, which is preferably an IBM RS/6000 workstation, is shown interconnected via network 30 to control server 40. Network 30 may be a token ring or Ethernet network and control server 40 is preferably another IBM RS/6000 server. Resident in control server 40 is API 50 of the invention.

Also interconnected to client server 20 is archive 60. Archive 60 likewise includes API 50, and is provided for controlling disk storage and an automated tape library. Archive 60 stores large quantities of multimedia content which is translated to digital format by an encoder and stored on tape cartridges in the tape library. Archive 60 supports a subset of content management functions. Archive 60 includes an integrated controller, disk storage, automated tape library, tape drives and software.

Digitized tape assets are staged, copied, from archive 60 to storage and distribution unit 64. Storage and distribution unit 64 is provided to perform disk asset storage and distribution functions. Storage and distribution unit 64 includes a combination of disks and the necessary networking hardware and software for delivering assets to clients and may be interconnected to other networks 68 and/or directly to other viewing stations which are contemplated to include both digital devices such as personal computers 70 and analog devices such as televisions 72, 74. Storage and distribution unit 64 is preferably a rack mounted IBM RS/6000, incorporating an IBM Model 39H or Model R20 RS/6000 system unit, up to five drawers of serial storage architecture (SSA) or three drawers of analog output cards and two drawer of SSA disks. Model 7133-00 SSA disk racks amy be utilized as extended content storage racks.

The environment shown in FIG. 1 may include one or more video creation stations (not shown) which create and store content in archive 60 and/or storage and distribution unit 64. While archive 60 should always be implemented as a separate server, application server 20, control server 40 and storage and distribution unit 64 may be separate servers as shown or be implemented in a single server or in any combination.

Figure 2:
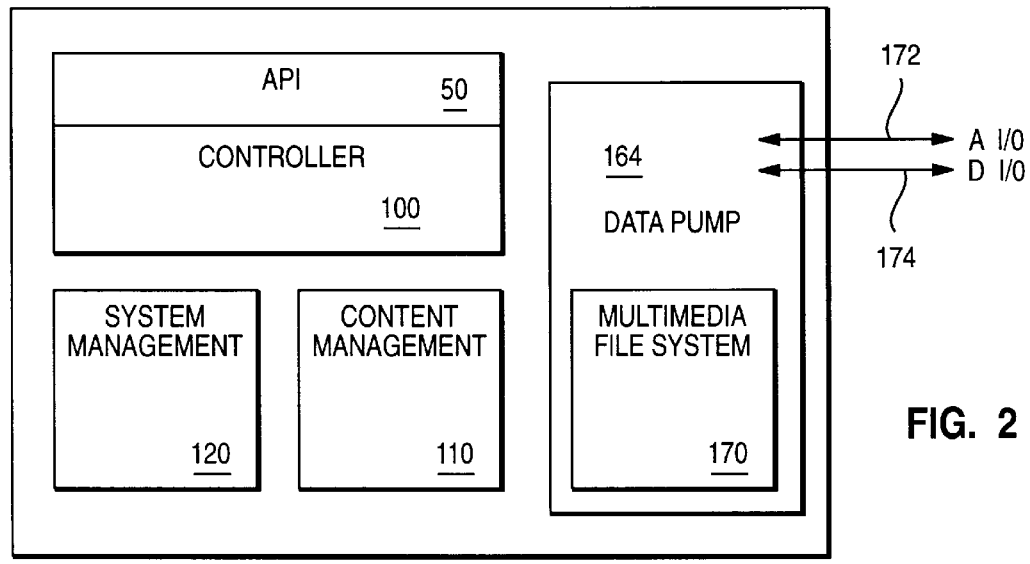
FIG. 2 shows software components of a system embodying the present invention.
Figure 4:
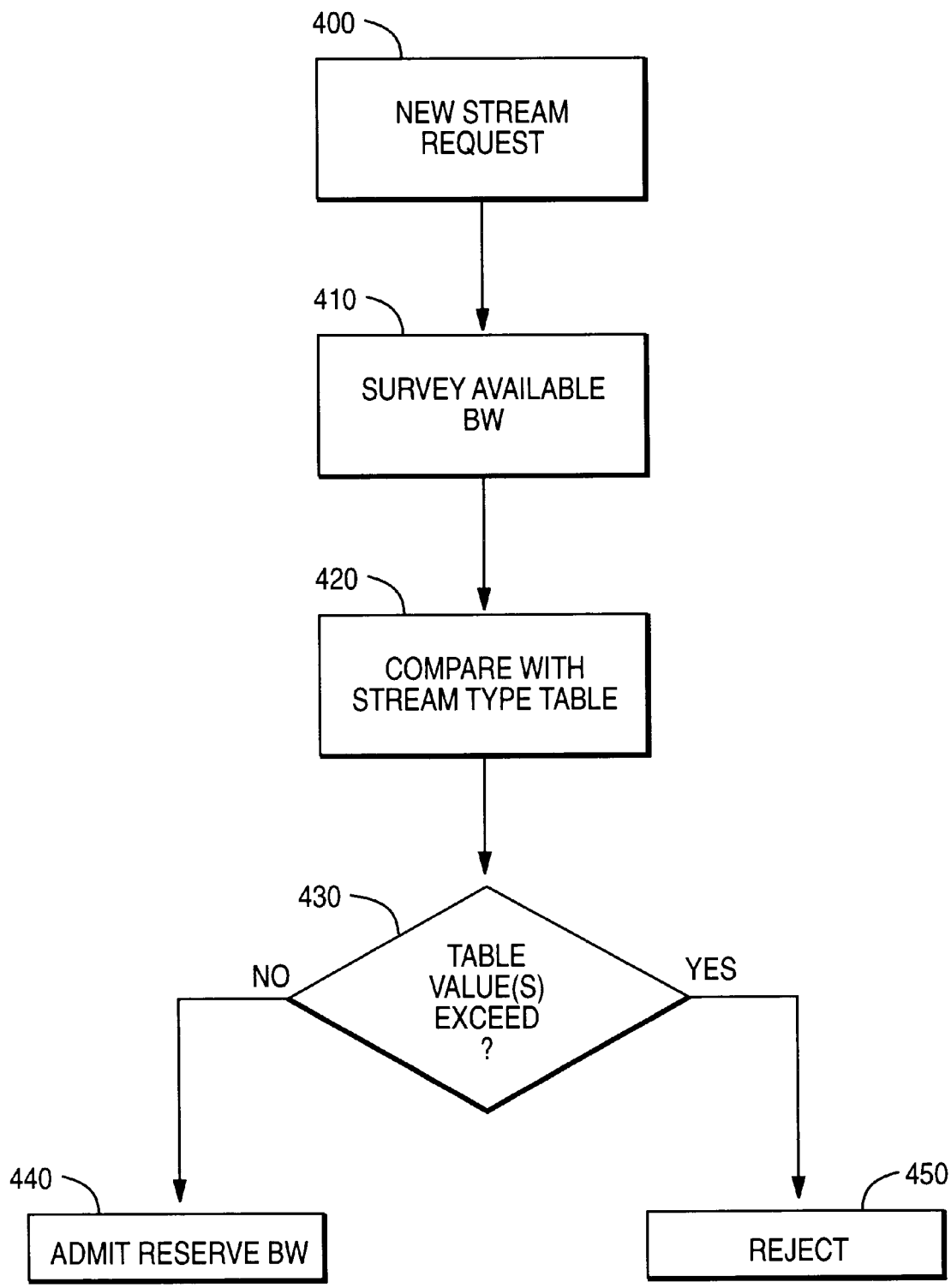
FIG. 4 illustrates the logic flow of admission control and bandwidth reservation in accordance with the present invention.
Figure 5:
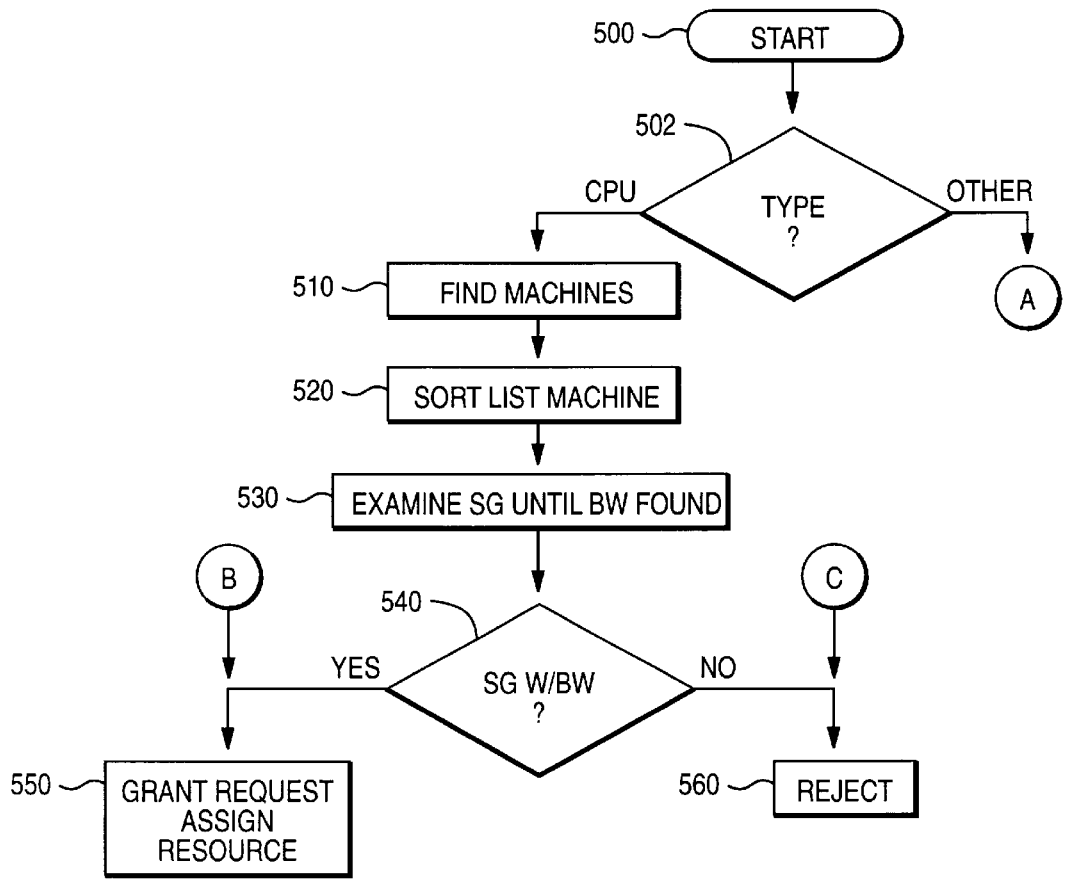
FIG. 5 illustrates the logic flow of load balancing in accordance with the invention.
Figure 5:
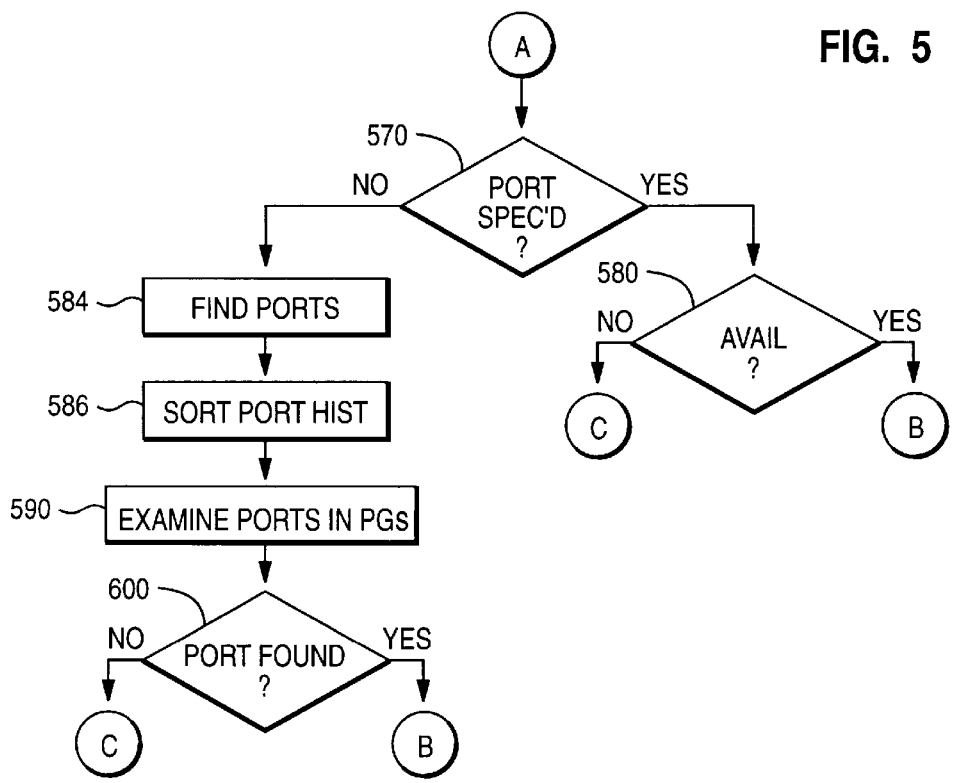

FIG. 2 illustrates the primary software components of the system of the invention. Controller 100 is provided for coordinating the system and is the central control point for set up and delivery of an asset. Control of the number of audio/video streams is in controller 100 for maintaining service quality across the system. Resource management, including load balancing and admission control, which will be described below with reference to FIGS. 4 and 5, is located in controller 100 as well. Play, stop, pause, jump, resume and record functions also reside in controller 100.

Access to controller 100 is via API 50 which will be described in greater detail in connection with FIG. 3.

Content management 110 provides tools for adding, deleting, viewing asset information and changing asset attributes. System management 120 provides tools for changing communications and storage configuration, monitoring the system and other functions beyond the scope of the present invention.

Data Pump (DP) 164 is provided to control I/O ports for play and record stream types and includes multimedia file system 170. DP 164 is equivalent to storage and distribution unit 64, FIG. 1. In the play mode DP 164 plays a file or list of files to a client across a network or through analog output ports 172 (one shown). In record mode, DP 164 receives data from a network and stores it into a file. Analog decoders support only outbound streams and ATM virtual circuits may be used for inbound or outbound streams. DP 164 handles only constant bit rate Moving Picture Expert Group (MPEG) streams. That is, MPEG decoders on the analog output ports produce National Television Standards Committee (NTSC) or Phase Alternation Line (PAL) output. ATM streaming ports 174 (one shown) provide smooth real time delivery of MPEG content over ATM networks.

Multimedia file system 170 is provided for managing storage of assets such as audio, video, text and graphics files. Multimedia file system 170 preferably comprises Redundant Array of Independent Disks (RAID) technology.

API 50 is the methodology for carrying out the present invention. API 50 comprises four major functional areas: Session Management; Stream Connection Management; Stream Operations; and Asset Management. API 50 is designed to provide digital media streaming with VCR control functions including play, pause, jump etc, Additionally, API 50 enables decoder assisted fast forward and slow motion play as well as other functions such as volume control. API 50 provides real time and best effort content loading to data pump 164 from remote systems including another product embodying the present invention, tape archive storage, remote files via FTP protocol, applications such as an analog-to-digital encoding application and other content management operations.

Among a wide array of functions, API 50 permits real time recording of a digital media stream from an ATM virtual circuit and real time digital media stream distribution from an ATM network input source to an analog output port. Real time, concurrent content load/record and play operations are supported by API 50. Further, static and dynamic connections to support multiple concurrent media streams access on multiple network types are provided by API 50.

Table I contains the four groups of calling sequences comprising the inventive multimedia server access framework. Session Management calls are used to establish a communication session with the system of the present invention. Stream Connection Management calls are used by an application to reserve, modify and release control server 40, FIG. 1 resources for stream operations. Port connections are used to support the three kinds of stream operations hereinabove described. Importantly, API 50 and the system of the instant invention support, in a given single session, the use of multiple ports for multiple concurrent stream accesses.

Stream Connection Management Calls cause control server 40 to select a data pump and its associated networks and device adapters. Control server 40 supports prereserved resources for ensuring a specified quality level of network access. Bandwidth is also reserved on selected devices when specifically requested so that subsequent I/O access for different assets is guaranteed. Alternatively, dynamic reservations are also supported when no specific bandwidth is requested when a port is opened, control server 40 reserves bandwidth, as required by a given stream, only when a stream operation is initiated. Stream Operations calls provide access to a media stream for play, record and pipe operations.

Asset Management functions are used for determining physical placement of assets and performing transfers of asset data in manner which is a function of asset characteristics.

TABLE I

| API Call | Description |
|---|---|
| "Session Management" | |
| msInit | Initialize client library |
| msOpenSession | Open a MediaStreamer session |
| msCloseSession | Close a session |
| msSetSessionAttr | Set session attributes |
| msGetSessionAttr | Get session attributes |
| msRegisterCallBack | Register a user callback |
| msUnregisterCallBack | Unregister a user callback |
| "Stream Connection Management | |
| msListPortGroups | Get list of configured port groups |
| msListPorts | Get list of configured port names |
| msOpenPort | Initialize a network connection |
| msClosePort | Terminate a network connection |
| msSetPortAttr | Set network attributes |
| msGetPortAttr | Get network attributes |
| "Stream Operations" | |
| msOpenPlayStream | Open a play stream |
| msOpenRecordStream | Open a record stream |
| msOpenPipeStream | Open a pipe stream |
| msCloseStream | Close a stream |
| msPlay | Start or resume playing a stream |
| msPause | Pause/stop a stream |
| msJump | Jump to a new stream position |
| msUpdatePlayStream | Update or add an asset to a play stream |
| msRemovePlayStream | Remove an asset from a play stream |
| msGetPlayStreamAttr | Get play stream attributes |
| msGetPlayStatus | Get play status |
| msRecord | Start or resume recording a stream |
| msGetRecordStatus | Get record status |
| msGetPipeStatus | Get pipe status |
| "Asset Management | |
| msListAssetGroups | Get list of asset group names |
| msListAssets | Get list of asset names |
| msOpenAsset | Open an asset |
| msCloseAsset | Close a asset |
| msDeleteAsset | Delete an asset |
| msSetAssetAttr | Set asset attributes |
| msGetAssetAttr | Get asset attributes |
| msSetAssetInfo | Set the asset meta data |
| msGetAssetInfo | Get the asset meta data |
| msGetAssetStatus | Get asset status |
| msGetAssetGrpStatus | Get asset group status |
| msStage | Stage an asset from archive to server |
| msLoad | Load one or more files as a single asset |
| msRead | Read a block of data from an asset |

TABLE I-continued

| API Call | Description |
|---|---|
| msWrite | Write a block of data to an asset |
| msSeek | Set the byte position within an asset |
| msRawAdd | Tell server about files that are assets |

Figure 3:
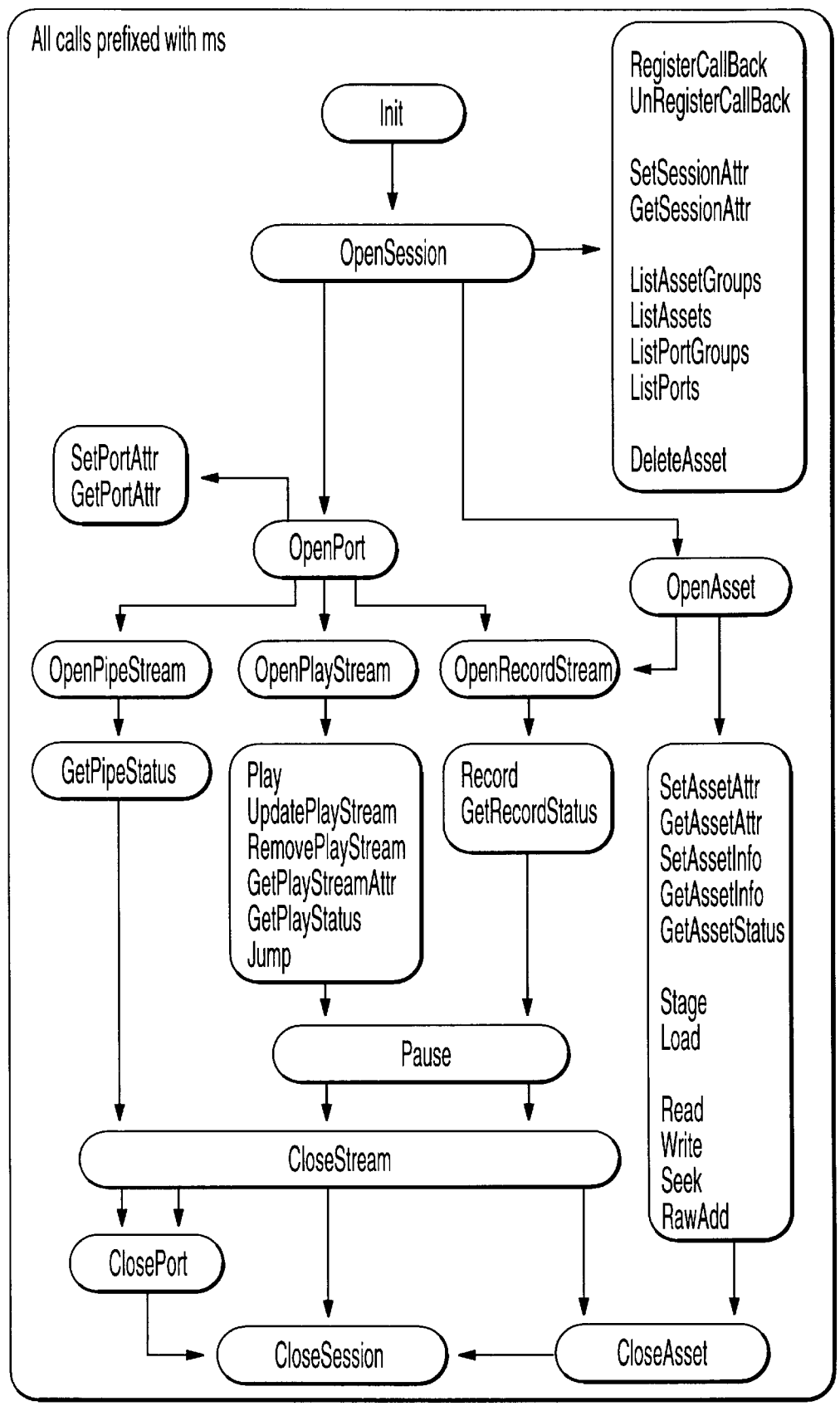
FIG. 3 is a schematic diagram of the calling sequences of the API of the invention.

FIG. 3 illustrates API 50 calling sequences set out in Table I and their interaction.

The following is a representative C ++ implementation of the major components of API 50. The calling sequences of API 50 are made available to client applications as linkable libraries. A given client library routes requests to control server 40, receives replies and returns messages to a client application.

Message communication between client libraries located at server 20 and control server 40 is transparent to applications. A shared library in AIX Version 4 provides standard C subroutine call/return models for API 50 which converts local subroutine calls to Remote Procedure Calls (RPCs) to network 30. More detailed descriptions of individual API calls and system details may be found in product manuals and other documentation available from IBM such as The AIX MediaStreamer Version 1 Programmer's Reference and The AIX VideoCharger Programmer's Reference.

```
/*------------------------------------
 |
 |    Session Management
 |
 *------------------------------------
msRC_t    msInit (
              unsigned long        startAddr,            /* in  */
              long                 size,                 /* in  */
              msVersionStr_t       version               /* in  */
          );
msRC_t    msOpenSession (
              msServerName_t       serverLocation,       /* in  */
              msServerInstance_t   serverInstance,       /* in  */
              msAssetGroup_t       assetGroup,           /* in  */
              msAppSignature_t     signature,            /* in  */
              msSessionHandle_t    *sessionHandle        /* out */
          );
msRC_t    msCloseSession (
              msSessionHandle_t    sessionHandle         /* in  */
          );
msRC_t    msSetSessionAttr (
              msSessionHandle_t    sessionHandle,        /* in  */
              msAssetGroup_t       assetGroup,           /* in  */
              msAppSignature_t     signature             /* in  */
          );
msRC_t    msGetSessionAttr (
              msSessionHandle_t    sessionHandle,        /* in  */
              msAssetGroup_t       *assetGroup,          /* out */
              msAppSignature_t     *signature,           /* out */
              msVersion_t          *version              /* out */
          );
msRC_t    msRegisterCallBack (
              msSessionHandle_t    sessionHandle,        /* in  */
              msEventMask          eventMask,            /* in  */
              void                 (*callBackAddr) (msEvent_t *)  /* in  */
          );
msRC_t    msUnregisterCallBack (
              msSessionHandle_t    sessionHandle         /* in  */
          );
msRC_t    msEnableTakeover (
              msSessionHandle_t    sessionHandle,        /* in  */
              long                 takeoverTimeout,      /* in  */
              msSessTakeover_t     *sessionTakeover      /* out */
          );
msRC_t    msTakeover (
              msSessTakeover_t     sessionTakeover,      /* in  */
              msAppSignature_t     signature,            /* in  */
              msSessionHandle_t    *sessionHandle,       /* out */
              msSessTakeoverInfo_t *sessTakeoverInfo     /* out */
          );
msRC_t    msGetSessionHandles (
              msSessionHandle_t    sessionHandle,        /* in  */
              long                 count,                /* in  */
              msSessTakeoverHandle_t *buffer             /* out */
          );
msRC_t    msTakeoverComplete (
              msSessionHandle_t    sessionHandle,        /* in  */
              void                 (*callBackAddr) (msEvent_t *)  /* in  */
          );
```

-continued

```
/*--------------------------------------------------*
|                                                  |
|      Connection Management                       *
|                                                  |
*--------------------------------------------------*/
msRC_t    msOpenPort (
              msSessionHandle_t      sessionHandle,       /* in     */
              asConnectMode          mode,                /* in     */
              long                   reservedBitRate,     /* in     */
              msPortGroup_t          portGroup,           /* in     */
              msUserAddr_t           *userAddr,           /* in-out */
              msNetworkParms_t       *parms,              /* in-out */
              msPortHandle_t         *portHandle,         /* out    */
              msPortState            *state               /* out    */
              );
msRC_t    msClosePort (
              msPortHandle_t         portHandle           /* in     */
              );
msRC_t    msSetPortAttr
              msPortHandle_t         portHandle,          /* in     */
              long                   reservedBitRate,     /* in     */
              msNetworkParms_t       *parms,              /* in-out */
              msPortState            *state               /* out    */
              );
msRC_t    msGetPortAttr (
              msPortHandle_t         portHandle,          /* in     */
              long                   *reservedBitRate,    /* out    */
              msPortGroup_t          *portGroup,          /* out    */
              msUserAddr_t           *Addr,               /* out    */
              msNetworkParms_t       *parms,              /* out    */
              msPortState            *state,              /* out    */
              msStreamHandle_t       *streamHandle        /* out    */
              );
msRC_t    msListPortGroups (
              msSessionHandle_t      sessionHandle,       /* in     */
              long                   *count,              /* out    */
              msPortGrpAttr_t        *buffer,             /* out    */
              long                   *size                /* in-out */
              );
msRC_t    msListPorts (
              msSessionHandle_t      sessionHandle,       /* in     */
              msPortGroup_t          *portGroup,          /* in     */
              msNetworkType          netType,             /* in     */
              long                   *count,              /* out    */
              msportList_t           *buffer,             /* out    */
              long                   *size                /* in-out */
              );
/*--------------------------------------*
|                                      |
|      Stream Operations               |
|                                      |
*--------------------------------------*/
msRC_t    msOpenPlayStream (
              msPortHandle_t         portHandle,          /* in     */
              msAssetName_t          assetName,           /* in     */
              msScale_t              maxScale,            /* in     */
              msStreamMode           mode,                /* in     */
              msPos_t                startPos,            /* in     */
              msPos_t                endPos,              /* in     */
              msScale_t              scale,               /* in     */
              long                   entry,               /* in     */
              long                   label,               /* in     */
              long                   nextLabel,           /* in     */
              msStreamHandle_t       *streamHandle        /* out    */
              );
msRC_t    msOpenRecordStream (
              msPortHandle_t         portHandle,          /* in     */
              msAssetHandle_t        assetHandle,         /* in     */
              msStreamMode           *mode,               /* in     */
              msPos_t                startPos,            /* in     */
              msPos_t                endPos,              /* in     */
              msStreamHandle_t       *streamHandle        /* out    */
              );
msRC_t    msopenPipeStream (
              msPortHandle_t         portIn,              /* in     */
              msPortHandle_t         portOut,             /* in     */
              msStreamType           type,                /* in     */
              msStreamHandle_t       *StreamHandle        /* out    */
              );
msRC_t    msCloseStream (
```

-continued

```
                msStreamHandle_t    streamHandle,         /* in     */
                );
msRC_t    msplay (
                msStreamHandle_t    streamHandle,         /* in     */
                long                entry,                /* in     */
                msPos_t             startPos,             /* in     */
                msPos_t             endPos,               /* in     */
                msScale_t           scale                 /* in     */
                );
msRC_t    msPause (
                msStreamHandle_t    streamHandle,         /* in     */
                long                entry,                /* in     */
                msStreamMode        mode,                 /* in     */
                msPos_t             stopPos               /* in     */
                );
msRC_t    msJump (
                msStreamHandle_t    streamHandle,         /* in     */
                long                entry,                /* in     */
                msPos_t             stopPos,              /* in     */
                msPos_t             startPos,             /* in     */
                msScale_t           scale                 /* in     */
                );
msRC_t    msUpdatePlayStream (
                msStreamHandle_t    streamHandle,         /* in     */
                msAssetName_t       assetName,            /* in     */
                msPos_t             startPos,             /* in     */
                msPos_t             endPos,               /* in     */
                msScale_t           scale,                /* in     */
                long                entry,                /* in     */
                long                label,                /* in     */
                long                nextLabel             /* in     */
                );
msRC_t    msRemovePlayStream (
                msStreamHandle_t    streamHandle,         /* in     */
                long                entry                 /* in     */
                );
msRC_t    msGetPlayStreamAttr (
                msStreamHandle_t    streamHandle,         /* in     */
                long                *count,               /* out    */
                msPlayStreamEntry_t *buffer,              /* out    */
                long                *size                 /* in-out */
                );
msRC_t    msGetPlayStatus (
                msStreamHandle_t    streamHandle,         /* in     */
                msPlayStatus_t      *playStatus           /* out    */
                );
msRC_t    msRecord (
                msStreamHandle_t    streamHandle,         /* in     */
                msPos_t             startPos,             /* in     */
                msPos_t             endPos                /* in     */
                );
msRC_t    msGetRecordStatus (
                msStreamHandle_t    streamHandle,         /* in     */
                msRecordStatus_t    *recordStatus         /* out    */
                );
msRC_t    msGetPipeStatus (
                msStreamHandle_t    streamHandle,         /* in     */
                msPipeStatus_t      *pipeStatus           /* out    */
                );
/*-------------------------------------*
|                                      |
|        Asset Management              |
|                                      |
*-------------------------------------*/
msRC_t    msListAssetGroups (
                msSessionHandle_t   sessionHandle,        /* in     */
                long                *Count,               /* out    */
                msAssetGrpAttr_t    *buffer,              /* out    */
                long                *size                 /* in-out */
                );
msRC_t    msListAssets (
                msSessionHandle_t   sessionHandle,        /* in     */
                msAssetGroup_t      assetGroup,           /* in     */
                long                *count,               /* out    */
                long                *nextEntry,           /* in-out */
                char                *buffer,              /* out    */
                long                size                  /* in     */
                );
msRC_t    msOpenAsset (
                msSsssionHandle_t   sessionHandle,        /* in     */
```

-continued

|  |  |  |  |  |  |
|---|---|---|---|---|---|
|  | msAssetName_t | assetName, | /* | in | */ |
|  | msAssetMode | openMode, | /* | in | */ |
|  | long | reserveBitRate, | /* | in | */ |
|  | msAssetHandle_t | *assetHandle | /* | out | */ |
|  | ); |  |  |  |  |
| msRC_t | msCloseAsset ( |  |  |  |  |
|  | msAssetHandle_t | assetHandle | /* | in | */ |
|  | ); |  |  |  |  |
| msRC_t | msDeleteAsset ( |  |  |  |  |
|  | msSessionHandle_t | sessionHandle, | /* | in | */ |
|  | msAssetName_t | assetName, | /* | in | */ |
|  | msDeleteCondition | condition | /* | in | */ |
|  | ); |  |  |  |  |
| msRC_t | msSetAssetAttr ( |  |  |  |  |
|  | msAssetHandle_t | assetHandle, | /* | in | */ |
|  | msAssetAttrFlags | flags, | /* | in | */ |
|  | msAssetAttributes_t | *attributes | /* | in | */ |
|  | ); |  |  |  |  |
| msRC_t | msGetAssetAttr ( |  |  |  |  |
|  | msAssetHandle_t | assetHandle, | /* | in | */ |
|  | msAssetAttributes_t | *attributes | /* | out | */ |
|  | ); |  |  |  |  |
| msRC_t | msSetAssetInfo ( |  |  |  |  |
|  | msAssetHandle_t | assetHandle, | /* | in | */ |
|  | msAssetDataKey | key, | /* | in | */ |
|  | char | *buffer, | /* | in | */ |
|  | long | size | /* | in | */ |
|  | ); |  |  |  |  |
| msRC_t | msGetAssetInfo ( |  |  |  |  |
|  | msAssetHandle_t | assetHandle, | /* | in | */ |
|  | msAssetDataKey | key, | /* | in | */ |
|  | char | *buffer, | /* | out | */ |
|  | long | *Size | /* | in-out | */ |
|  | ); |  |  |  |  |
| msRC_t | msGetAssetStatus ( |  |  |  |  |
|  | msAssetHandle_t | assetHandle, | /* | in | */ |
|  | msAssetStatus_t | *assetStatus | /* | out | */ |
|  | ); |  |  |  |  |
| msRC_t | msGetAssetGrpStatus ( |  |  |  |  |
|  | msSessionHandle_t | hSession, | /* | in | */ |
|  | msAssetGroup_t | assetGroup, | /* | in | */ |
|  | msAssetGrpStatue_t | *assetGrpstatus | /* | out | */ |
|  | ); |  |  |  |  |
| msRC_t | msStage ( |  |  |  |  |
|  | msAssetHandle_t | assetHandle, | /* | in | */ |
|  | long | Count, | /* | in | */ |
|  | msAssetLocation_t | *location, | /* | in | */ |
|  | msInt64_t | startOffset, | /* | in | */ |
|  | msInt64_t | endOffset | /* | in | */ |
|  | ); |  |  |  |  |
| msRC_t | msRead ( |  |  |  |  |
|  | msAssetHandle_t | assetHandle, | /* | in | */ |
|  | char | *buffer, | /* | out | */ |
|  | long | size, | /* | in | */ |
|  | long | *bytesRead | /* | out | */ |
|  | ); |  |  |  |  |
| msRC_t | msWrite ( |  |  |  |  |
|  | msAssetHandle_t | assetHandle, | /* | in | */ |
|  | char | *buffer, | /* | in | */ |
|  | long | size, | /* | in | */ |
|  | long | *bytesWrite | /* | out | */ |
|  | ); |  |  |  |  |
| msRC_t | msSeek ( |  |  |  |  |
|  | msAssetHandle_t | assetHandle, | /* | in | */ |
|  | msSeekWhence | whence, | /* | in | */ |
|  | msInt64_t | offset | /* | in | */ |
|  | ); |  |  |  |  |
| msRC_t | msLoad ( |  |  |  |  |
|  | msAssetHandle_t | assetHandle, | /* | in | */ |
|  | msAssetAttrFlags | flags, | /* | in | */ |
|  | msAssetAttributes_t | *attributes, | /* | in | */ |
|  | msHostName_t | hostName, | /* | in | */ |
|  | msUserID_t | userID, | /* | in | */ |
|  | msPassword_t | password, | /* | in | */ |
|  | long | numFiles, | /* | in | */ |
|  | msPathName_t | fileName[ ] | /* | in | */ |
|  | ); |  |  |  |  |
| msRC_t | nsRawAdd |  |  |  |  |
|  | msAssetHandle_t | assetHandle, | /* | in | */ |
|  | msAssetAttrFlags | flags, | /* | in | */ |

| | | | | |
|---|---|---|---|---|
| msAssetAttributes_t | *attributes, | /* | in | */ |
| char | *URLName | /* | in | */ |
| ); | | | | |

FIG. 4 illustrates the logic followed in the present invention when performing admission control. Admission control involves scrutiny of system requirements for handling a given new real time stream. It is essential that real time streams maintain a constant rate of play. If the quality of any existing stream would be degraded by the addition of the new stream, the new stream is rejected. A table, not shown, is constructed for correlating stream rate for different transaction types—play record, pipe, manage content - and connectivity types—analog, ATM and IP.

At step 400 a new real time stream request is presented to control server 40. At step 410, available disk bandwidth, processor cycle, bus bandwidth and output port bandwidth, critical system resources, are examined whenever a new stream seeks entry. Knowing stream characteristics, control server 40 is able to consult the above table at step 420 and compare the table entry with the results of its survey of available resources. Then at step 430 the decision is made whether to admit at step 440 or reject at step 450 the new stream as a function of whether the data returned from the table indicates that the available bandwidth of any one of the four critical resources would be exceeded. Step 440 includes the reservation of the resources found to be available at the time of the request until service of that request is completed.

Turn now to FIG. 5 for a description of the load balancing technique of the present invention. This technique is intended to assist in optimizing overall system performance by balancing loads across processors, buses, ports and stripe groups. Load balancing logic, executed in control server 40 and here depicted, is entered at step 500 when a client issues a resource request, which request includes information characterizing the requested resource. At step 502 the type of request is determined. At step 510 the logic determines which machines in the system have the video and connectivity to that client. Step 520 represents sorting the machines meeting the criteria of step 510 based on the existing bandwidth load thereon. Then at sequence 530, for every machine on the list resulting from step 520, each stripe group in an asset group is examined to determine the existence of sufficient available bandwidth. When a stripe group with sufficient bandwidth is found to exist at step 540, the client request is granted and resources are assigned at block 550. Should the list from step 520 be exhausted with none of the stripe groups in the asset group having sufficient available bandwidth to service the request, it is rejected at block 560.

Step 570 is executed when the client request is for a specific port or port group. If the request includes a demand for a specific port, and that port is found to be available and to have sufficient bandwidth at test 580, the client request is granted and resources assigned. Otherwise, the request is rejected.

When test 570 finds that the client request indicates that any available port in the specified port group is acceptable, a sequence similar to that described above for disks is begun at step 584. Step 584 finds all suitable ports in the specified port group. At step 586, those ports are sorted and a list of port groups is prepared. Then step 590 is executed to examine each port in the port group. When a satisfactory port is found at test 600 to have enough available bandwidth, the client request is granted and resources assigned. If no port is found, the client request is denied. The determination of sufficiency of available bandwidth for each client request type is made having reference to the same table used for admission control. This scheme for balancing loads may used for handling requests for real time as well as best efforts requests in client/server environments.

In summary, the present invention provides improved multimedia serving in a client/server environment by providing real time services by limiting the grant of requests for new streams to those for which there is sufficient bandwidth available and which can be handled with no negative impact on current streams.

Although a preferred embodiment has been shown and described, it will be understood that changes and modifications may be made therein without departing from the scope of the appended claims.

What is claimed is:

1. A system including an improved multimedia server for storage and delivery of multimedia content on demand to a client interconnected over a network with a plurality of clients, servers, and resource types, comprising:

an application programming interface for allowing client control of session management, stream connection management, stream operations management and asset management in a manner that makes network type and physical location of assets transparent to the client;

means for server bandwidth management for maintaining quality of existing stream service by rejecting new requests which would cause degradation thereto;

means for optimizing system resource utilization by balancing loads on resource types associated with said server; and means for controlling concurrent, real time content loading and data streaming operations initiated by said client.

2. The system of claim 1 wherein said application programming interface includes:

a common programming model comprising a naming structure for server and network resources;

a common addressing scheme for accessing server and network resources; and means for logically grouping said resources by resource type for sharing by a plurality of clients.

3. The system of claim 2 wherein said server bandwith management means includes:

pre-established table means providing for each resource type, bandwidth requirements for all possible stream rates for every transaction and connectivity type;

table lookup means for determining bandwidth requirements of a given request;

means for comparing pre-established bandwidth requirements of said given request with available bandwidth capacity; and means for accepting or rejecting said given request as a function of results of operation of said means for comparing pre-established bandwidth requirements.

4. The system of claim 3 additionally including:

means operable when a given request is accepted for reserving bandwidth necessary for said request until said request has been completely serviced.

5. The system of claim 3 wherein said means for optimizing by balancing loads on resources associated with said server comprises:

means for surveying available bandwidth capacity on resources of a type included in a service request;

means for comparing bandwidth capacity required for servicing said request with bandwidth available on resources appropriate for handling said request; and means for assigning resources for said request as a function of results of operation of said means for comparing bandwidth capacity.

6. In a multimedia server, a method for storing and delivering multimedia content on demand to requesting clients interconnected over a network including a plurality of clients, servers and resource types comprising the steps of:

providing an application programming interface for enabling client control of session management, stream connection management, stream operations management and asset management in a manner making network type and asset location transparent to said requesting clients;

managing server bandwidth to maintain existing stream service quality by rejecting new requests, acceptance and handling of which would degrade system performance; and optimizing system resource utilization by balancing loads on resource types associated with said server.

7. The method of claim 6 wherein said providing step includes the steps of:

naming server and network resources within a common naming structure;

accessing server and network resources in accordance with a common addressing scheme; and logically grouping resources associated with said server by resource type.

8. The method of claim 7 wherein said managing step includes:

using a pre-established table for recording for each resource type, bandwidth requirements for all possible stream rates for every transaction type and every connectivity type;

determining bandwidth requirements for a given client request through lookup in said pre-established table;

surveying available resource bandwidth;

comparing bandwidth requirements determined in said determining step with results of said surveying step; and accepting or rejecting said given client request as a function of results of said comparing bandwidth requirements step.

9. The method of claim 8 including the additional step of:

reserving bandwidth necessary for servicing said given client request, accepted in said accepting or rejecting step, until said request is completely serviced.

10. The method of claim 8 wherein said optimizing step comprises:

surveying available bandwidth capacity on resources of a type included in said given client request;

comparing bandwidth capacity required for handling said request with bandwidth available on resources appropriate for handling said request; and assigning resources to handle said request when said comparing bandwidth capacity step indicates sufficient bandwidth capacity is available.

11. A computer program having data structures included on a computer readable medium which is readable by a system including a multimedia server for storage and delivery of multimedia content on demand to a client interconnected over a network with a plurality of clients, server, and resource types comprising:

an application programming interface for allowing client control of session management, stream connection management, stream operations management and asset management in a manner that makes network type and physical location of assets transparent to the client;

means for server bandwidth management for maintaining quality of existing stream service by rejecting new requests which would cause degradation thereto;

means for optimizing system resource utilization by balancing loads on resource types associated with said server; and means for controlling concurrent, real time content loading and data streaming operations initiated by said client.

12. The computer program of claim 11 wherein said application programming interface includes:

a common programming model comprising a naming structure for server and network resources;

a common addressing scheme for accessing server and network resources; and means for logically grouping said resources by resource type for sharing by a plurality of clients.

13. The computer program according to claim 12 wherein said server bandwidth management means includes:

pre-established table means providing for each resource type, bandwidth requirements for all possible stream rates for every transaction and connectivity type;

table lookup means for determining bandwidth requirements of a given request;

means for comparing pre-established bandwidth requirements of said given request with available bandwidth capacity; and means for accepting or rejecting said given request as a function of results of operation of said means for comparing pre-established bandwidth requirements.

14. The computer program according to claim 13 additionally including:

means operable when a given request is accepted for reserving bandwidth necessary for said request until said request has been completely serviced.

15. The computer program according to claim 13 wherein said means for optimizing by balancing loads on resources associated with said server comprises:

means for surveying available bandwidth capacity on resources of a type included in a service request;

means for comparing bandwidth capacity required for servicing said request with bandwidth available on resources appropriate for handling said request; and means for assigning resources for said request as a function of results of operation of said means for comparing bandwidth capacity.

* * * * *